(12) United States Patent
Wilson

(10) Patent No.: US 10,272,556 B2
(45) Date of Patent: Apr. 30, 2019

(54) JACKHAMMER FOLDING TROLLEY

(71) Applicant: John Wilson, Vista, CA (US)

(72) Inventor: John Wilson, Vista, CA (US)

( * ) Notice: Subject to any disclaimer, the term of this patent is extended or adjusted under 35 U.S.C. 154(b) by 0 days.

(21) Appl. No.: 15/486,200

(22) Filed: Apr. 12, 2017

(65) Prior Publication Data

US 2018/0085907 A1  Mar. 29, 2018

Related U.S. Application Data

(60) Provisional application No. 62/401,797, filed on Sep. 29, 2016.

(51) Int. Cl.
| | |
|---|---|
| *B25D 17/32* | (2006.01) |
| *B62B 3/10* | (2006.01) |
| *B62B 3/02* | (2006.01) |
| *B60L 1/00* | (2006.01) |
| *E04G 23/00* | (2006.01) |
| *B25D 17/04* | (2006.01) |
| *B62B 5/06* | (2006.01) |

(52) U.S. Cl.
CPC ........... *B25D 17/32* (2013.01); *B25D 17/043* (2013.01); *B60L 1/006* (2013.01); *B62B 3/022* (2013.01); *B62B 5/064* (2013.01); *B62B 5/065* (2013.01); *E04G 23/006* (2013.01); *B60L 2200/40* (2013.01); *B62B 3/10* (2013.01); *B62B 5/067* (2013.01)

(58) Field of Classification Search
CPC ................... B25D 17/25; B25D 17/28; B25D 2217/0073; B25D 17/32; B25D 17/043; B60L 1/006; B60L 2200/40; B60R 16/03; E04G 23/006; B62B 3/022; B62B 3/04; B62B 3/10; B62B 5/00; B62B 5/0006; B62B 5/062; B62B 5/067; B62B 5/064; B62B 5/065
USPC .......................................................... 280/651
See application file for complete search history.

(56) References Cited

U.S. PATENT DOCUMENTS

| | | | | | |
|---|---|---|---|---|---|
| 5,462,127 | A | * | 10/1995 | Svensson | B25D 17/24 173/162.1 |
| 6,135,566 | A | * | 10/2000 | Anderson | E04G 23/006 299/36.1 |
| 7,080,851 | B2 | * | 7/2006 | Schipper | B24B 27/08 280/47.2 |
| 8,240,682 | B2 | * | 8/2012 | Kennard | B25D 17/043 173/125 |
| D668,420 | S | * | 10/2012 | Kennard | D34/24 |

(Continued)

*Primary Examiner* — John D Walters
(74) *Attorney, Agent, or Firm* — Mu P.C.; Jeffrey Charles Mirich

(57) ABSTRACT

The present invention is a folding jackhammer trolley. The trolley is comprised of a main frame, wheel frame, and handle frame. One or more adjustable brackets are provided on the main frame to retain a jackhammer. The brackets are adjustable by hand and require no tools to properly secure a jackhammer. Rollers are provided on the front end of the main frame, and wheels are provided on the wheel frame to allow the trolley to be mobile. Clutch locking mechanisms are actuated by levers provided on the handle bars. When the levers are engaged by a user the angles of the handle frame and wheel frame are adjustable relative to the main frame. The adjustments allow for prying motions to be carried out and for the handle frame to suit different user heights.

20 Claims, 16 Drawing Sheets

(56) References Cited

U.S. PATENT DOCUMENTS

| | | | |
|---|---|---|---|
| 9,452,599 B1* | 9/2016 | Rodriguez | B32B 43/006 |
| 2007/0228805 A1* | 10/2007 | Due | E01C 23/124 |
| | | | 299/37.1 |
| 2017/0002576 A1* | 1/2017 | Chambers | E04G 23/006 |
| 2017/0138072 A1* | 5/2017 | Tailly | E04G 23/006 |

* cited by examiner

Fig. 6
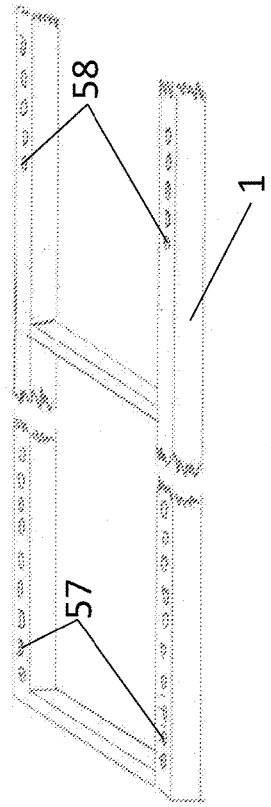
Fig. 6c
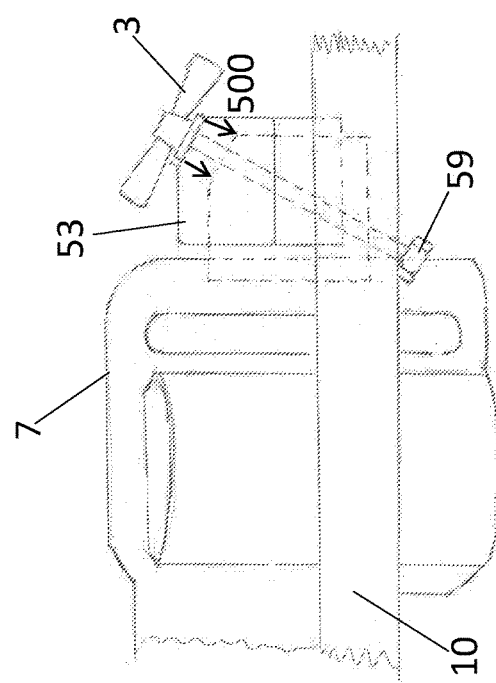
Fig. 6d
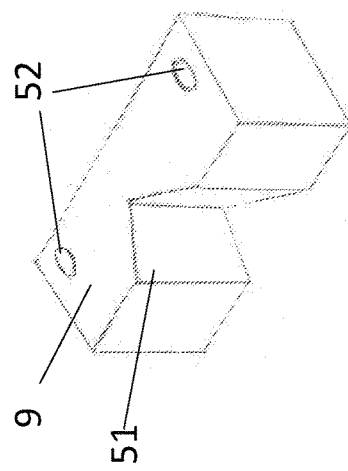
Fig. 6a
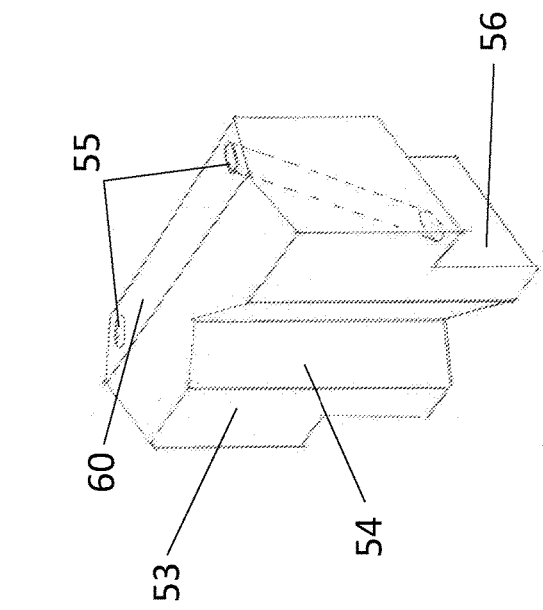
Fig. 6b

Fig. 7
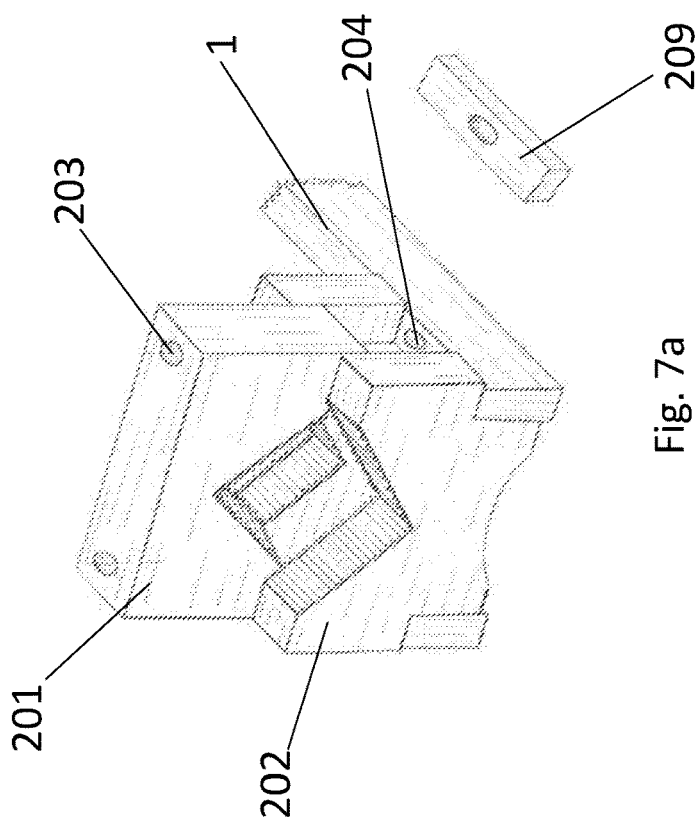
Fig. 7a
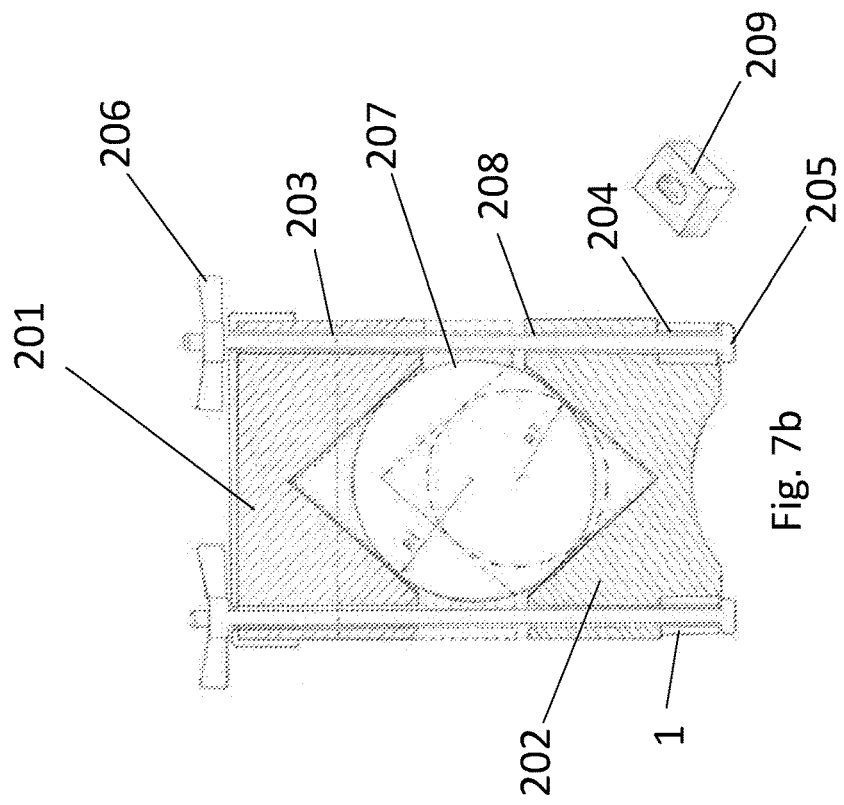
Fig. 7b

Fig. 8
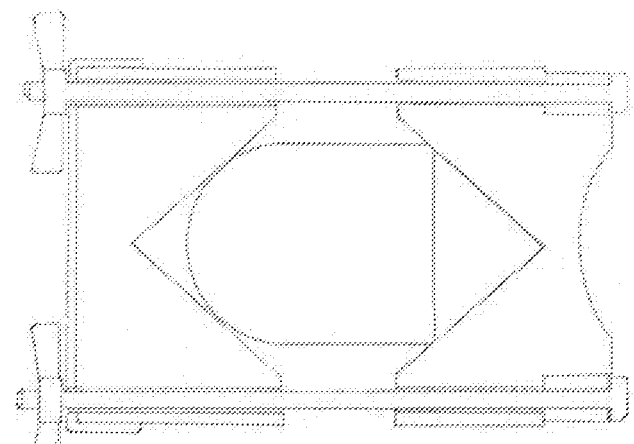
Fig. 8c
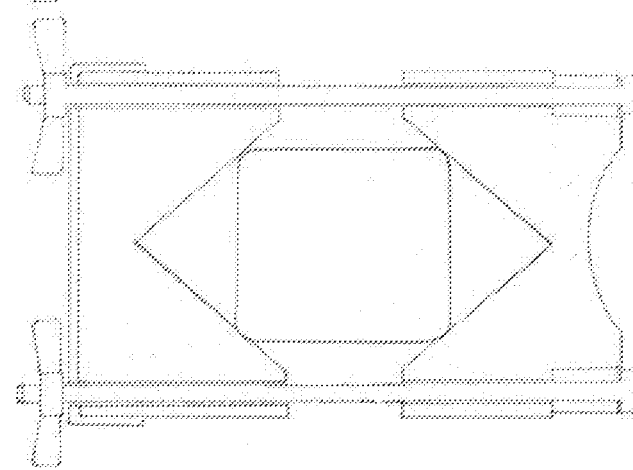
Fig. 8b
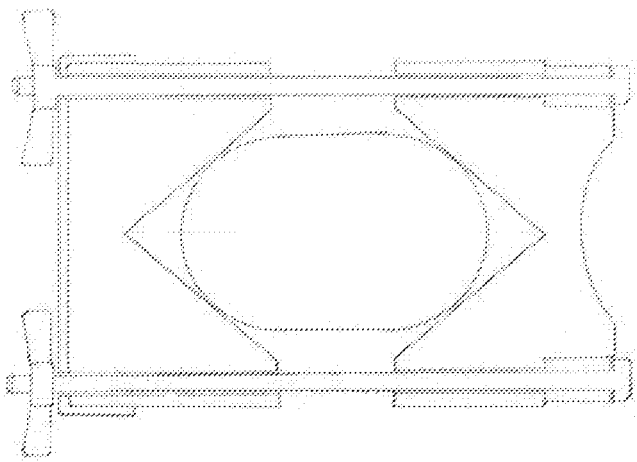
Fig. 8a

Fig. 11
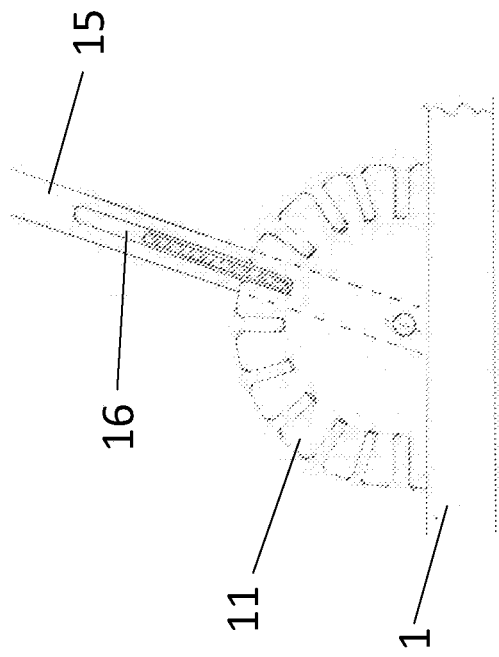
Fig. 11b
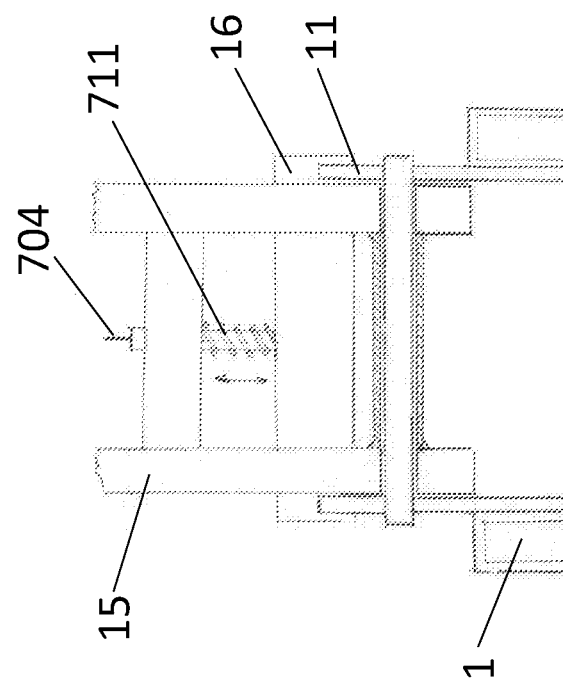
Fig. 11a

Fig. 12
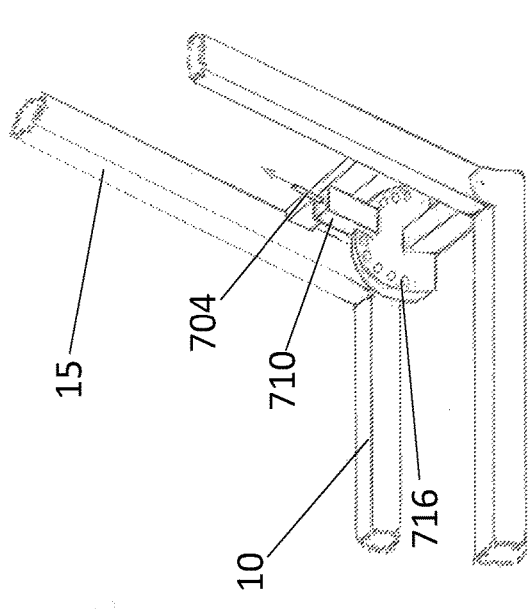
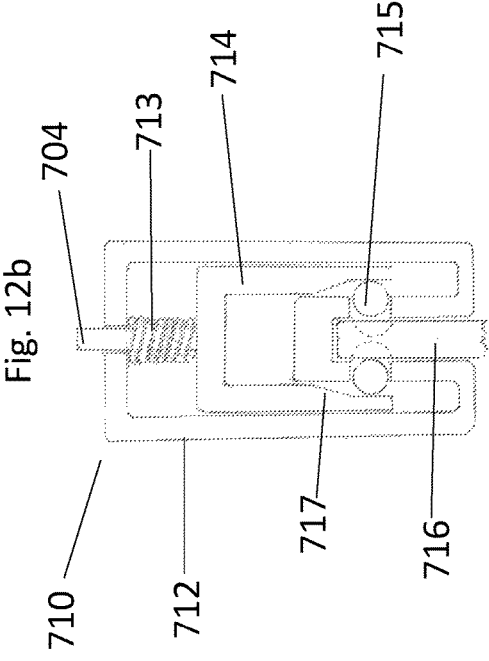
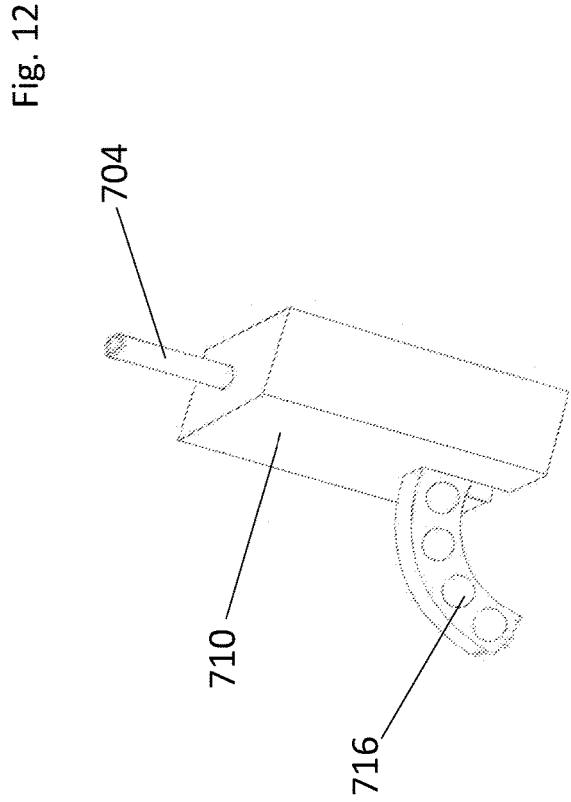
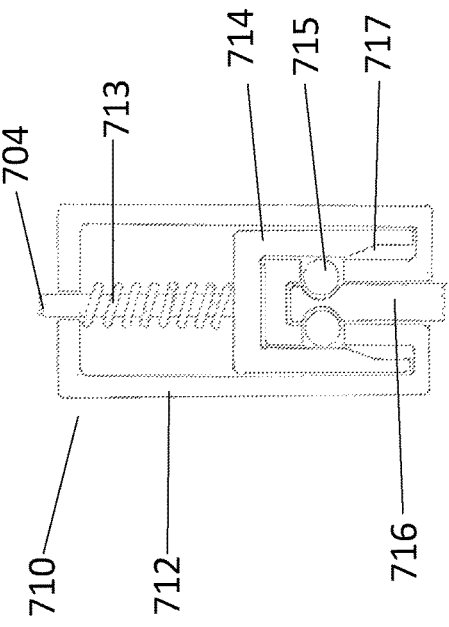
Fig. 12a
Fig. 12b
Fig. 12c
Fig. 12d

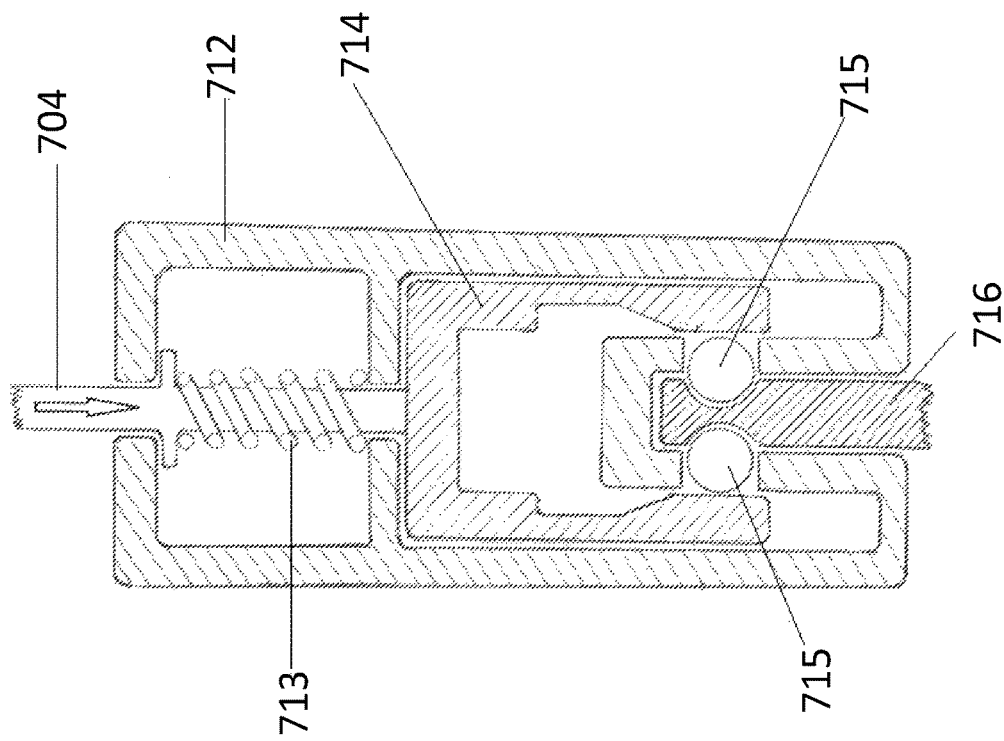

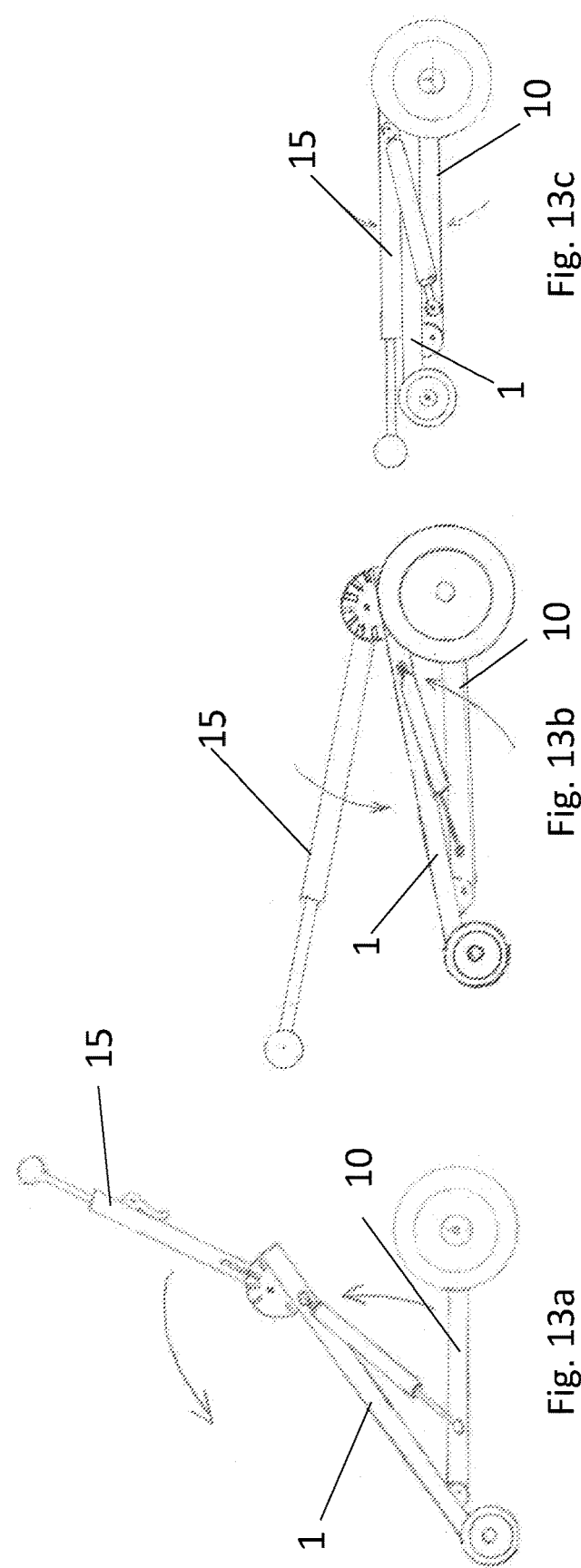

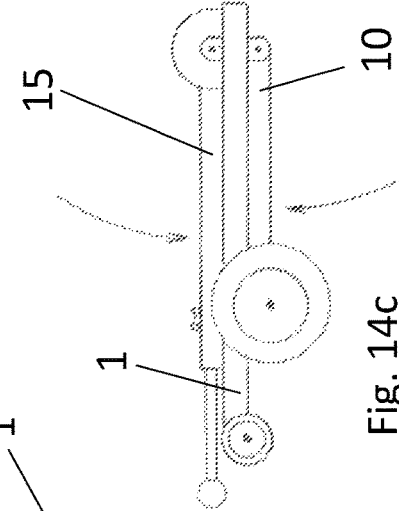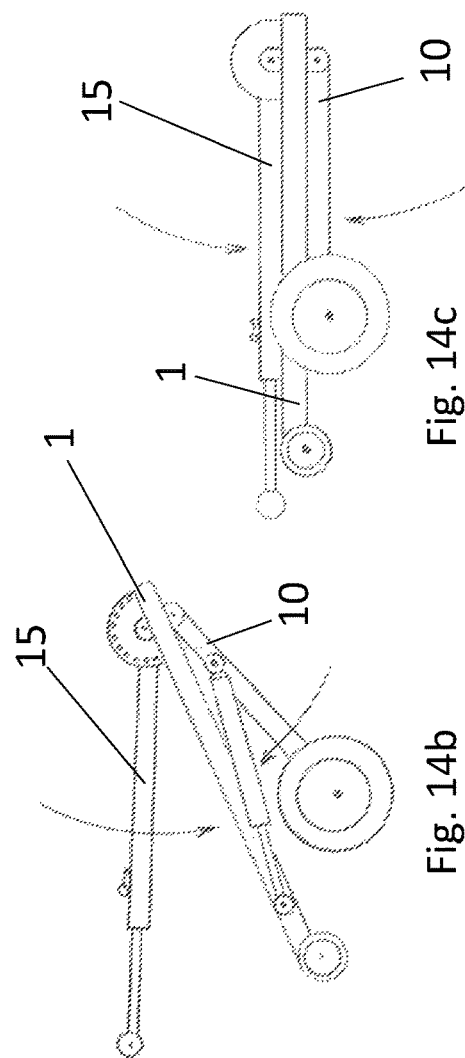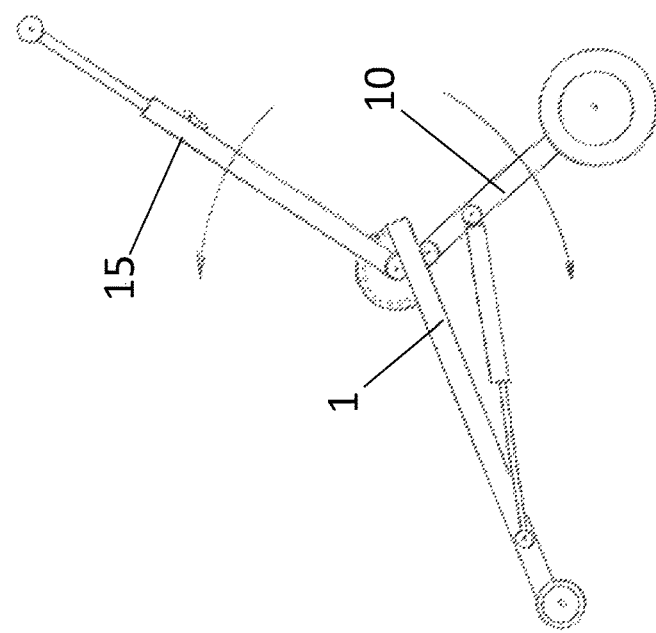
Fig. 14

Fig. 15
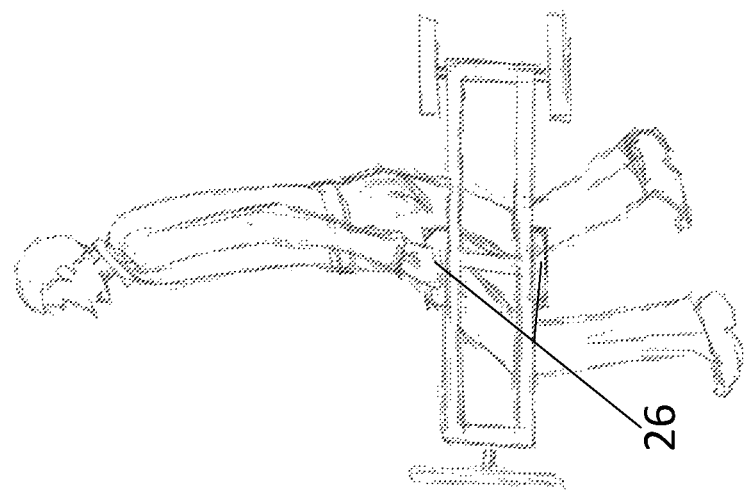
Fig. 15b
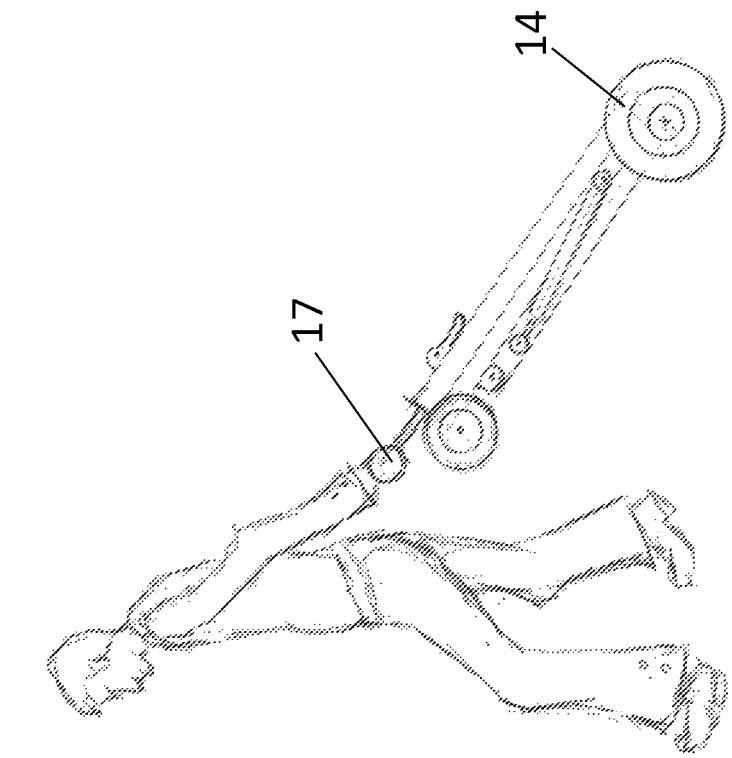
Fig. 15a

JACKHAMMER FOLDING TROLLEY

CROSS-REFERENCE TO RELATED APPLICATION(S)

The present application claims priority to U.S. Provisional Patent Application No. 62/401,797 filed on Sep. 29, 2016, entitled "FOLDING JACKHAMMER TROLLEY" the entire disclosure of which is incorporated by reference herein.

BACKGROUND OF THE INVENTION

1. Field of Invention

The present invention relates to the field of power tools, and more specifically to trolley systems designed for jackhammers.

2. Description of Related Art

Breaking and removing ceramic tiles and hardwood flooring is a common task for a construction worker. Special tools and chisels have been designed for the task, but completely removing all tiles from a floor can daunting. With the advent of the electric power tools such electric rotary hammers and electric jackhammers, the amount of time required to remove tiles or hardwood from a floor has been significantly reduced.

Electric jackhammers are a vast improvement from manual tools, but they still require a great deal of labor to operate. They are often very heavy, at least 35 pounds or more, and during normal operation they are known to shake violently. As a user operates the electric jack hammer they must apply a considerable amount of force to keep it under control. For the best results when removing tiles or hardwood, the user must keep the jack hammer at an angle close to 15 degrees relative to the floor. This allows the user to remove the tile or flooring set from the concrete instead of breaking the tile. In order to achieve this angle, the user must bend over while supporting the weight of the jack hammer. Repetition of these tasks could cause severe strain or back injury to the worker/user.

Trolleys have been developed to help alleviate the strain of using a jackhammer at low angles. The trolleys that are currently available are able to support the weight of a jackhammer, but still require the user to apply a significant amount of force to counteract the push-back experienced during operation. The available trolleys still require the user to bend down during operation in order to achieve the appropriate angle to remove the tiles.

Based on the foregoing, there is a need in the art for a jackhammer support device which reduces the force required to operate a jackhammer. Furthermore, what may be desired is a trolley which can be adjusted to comfortably fit a user of any size.

SUMMARY OF THE INVENTION

The present invention is a folding jackhammer trolley. In the preferred embodiment, the jackhammer is comprised of a main frame. The main frame is further comprised of a front and rear end, adjustable brackets adapted to retain a jackhammer, and one or more rollers provided at the front end.

The jackhammer trolley is further comprised of a wheel frame, which is adjustably attached to the main frame of the trolley via a first clutch locking mechanism. The wheel frame is provided with one or more wheels.

In the preferred embodiment, the jackhammer trolley is further comprised of a handle frame. The handle frame is attached to the rear end of the main frame. The handle frame is further comprised of a top end and a bottom end. A handlebar extends from the top end of the handle frame and one or more adjustment levers are mounted on the handlebar.

In the preferred embodiment, a user actuates one of the adjustment levers to adjust the angle of the wheel frame relative to the main frame by actuating the first clutch locking mechanism. This allows for a prying motion which is effective for removing tile-sets.

In another embodiment of the present invention, the handle frame is also adjustable relative to the main frame via a second clutch locking mechanism, and a second adjustment lever is provided on the handlebar to adjust the angle of the handle frame relative to the main frame.

In a further embodiment of the present invention, a bumper is provided on the rear end of the main frame to dampen kick back created by the jackhammer when it's operating.

In another embodiment, the folding jack hammer trolley is further comprised of a shock absorber between the handle frame and handle bar. In an embodiment, the shock absorber allows the handle bar to be extensible from the handle frame. Ergonomic hand grips are additionally provided on the handlebar.

In another embodiment of the present invention, the handle frame of the folding is further provided with a power output to connect the power cable of the jackhammer to. The folding jackhammer trolley, may be further provided with a breaker switch located on the handle frame to provide an easy access power switch and electric surge prevention. Additionally, a lamp is provided on the handle frame for working in dark or poorly lit areas, and a cord post is also provided on the handle frame to organize excess cord length.

In an embodiment of the folding jack hammer trolley, a carrying handle is provided on the main frame for portability.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

FIG. 6a is a perspective view of the bumper component, according to an embodiment of the present invention;

FIG. 6b is a perspective view of the bumper component, according to an embodiment of the present invention;

FIG. 6c is a perspective view of the bracket component, according to an embodiment of the present invention;

FIG. 6d is a perspective view of the bumper component in use, according to an embodiment of the present invention;

FIG. 7a is a perspective view of the bracket component, according to an embodiment of the present invention;

FIG. 7b is a front elevational view of the bracket component, according to an embodiment of the present invention;

FIG. 8a is a front elevational view of the bracket component in use, according to an embodiment of the present invention;

FIG. 8b is a front elevational view of the bracket component in use, according to an embodiment of the present invention;

FIG. 8c is a front elevational view of the bracket component in use, according to an embodiment of the present invention;

FIG. 11a is a front elevational view of the frame adjustment mechanism, according to an embodiment of the present invention;

FIG. 11b is a left side elevational view of the disc clutch, according to an embodiment of the present invention;

FIG. 12a is a perspective view of the locking mechanism, according to an embodiment of the present invention;

FIG. 12b is a perspective view of the locking mechanism, according to an embodiment of the present invention;

FIG. 12c is a sectional view of the bearing clutch, according to an embodiment of the present invention;

FIG. 12d is a sectional view of the bearing clutch, according to an embodiment of the present invention;

FIG. 12e is a sectional view of the bearing clutch, according to an embodiment of the present invention;

FIG. 12f is a sectional view of the bearing clutch, according to an embodiment of the present invention;

FIG. 13a is a left side elevational view of the folding jackhammer trolley, according to an embodiment of the present invention;

FIG. 13b is a left side elevational view of the folding jackhammer trolley, according to an embodiment of the present invention;

FIG. 13c is a left side elevational view of the folding jackhammer trolley, according to an embodiment of the present invention;

FIG. 14a is a left side elevational view of the folding jackhammer trolley, according to an embodiment of the present invention;

FIG. 14b is a left side elevational view of the folding jackhammer trolley, according to an embodiment of the present invention;

FIG. 14c is a left side elevational view of the folding jackhammer trolley, according to an embodiment of the present invention;

FIG. 15a is a left side elevational view of the folding jackhammer trolley in use, according to an embodiment of the present invention;

FIG. 15b is a left side elevational view of the folding jackhammer trolley, according to an embodiment of the present invention;

DETAILED DESCRIPTION OF PREFERRED EMBODIMENTS

Figure 1:
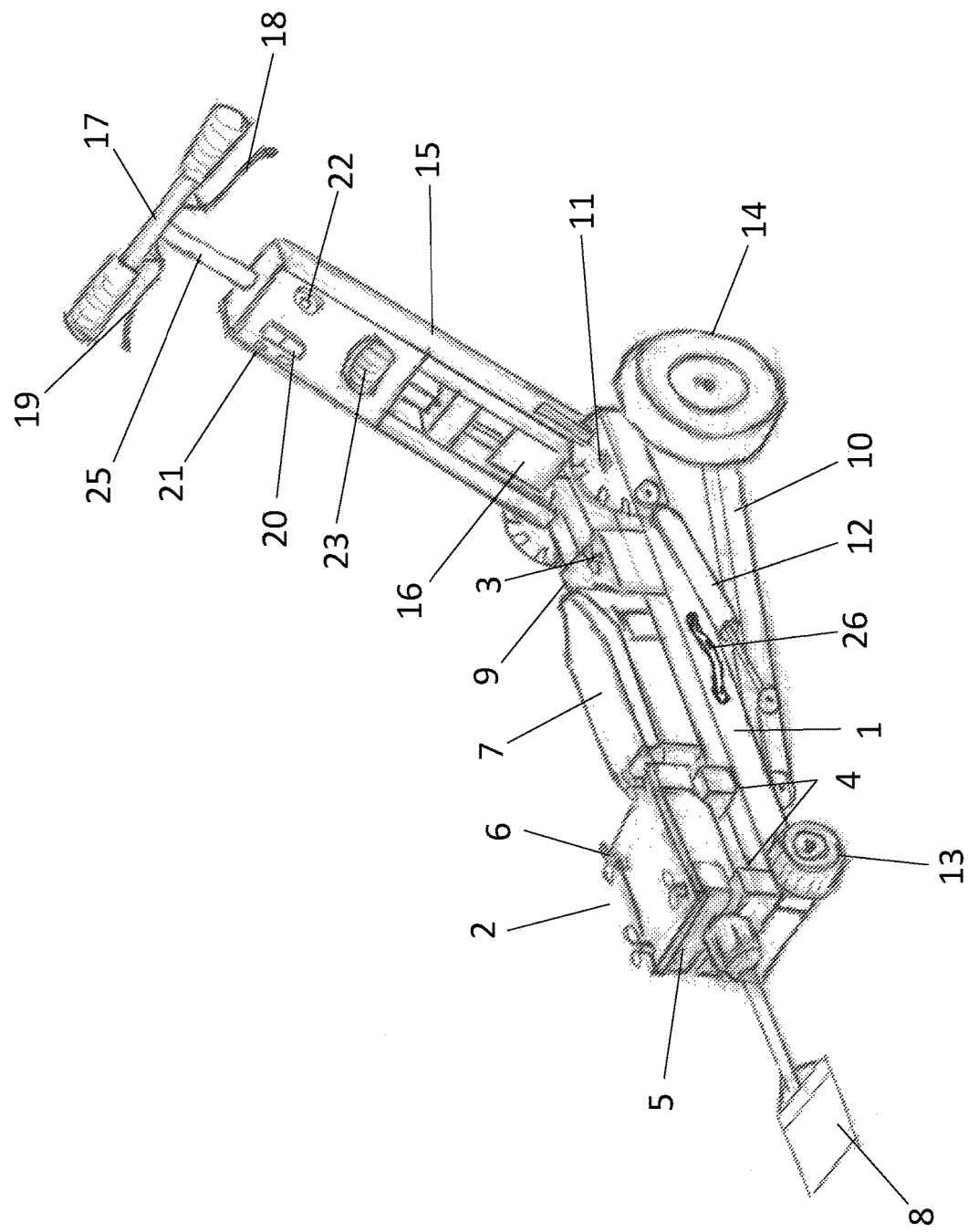
FIG. 1 is a perspective view of the folding jackhammer trolley, according to an embodiment of the present invention.

Preferred embodiments of the present invention and their advantages may be understood by referring to FIGS. 1-15, wherein like reference numerals refer to like elements.

Figure 2:
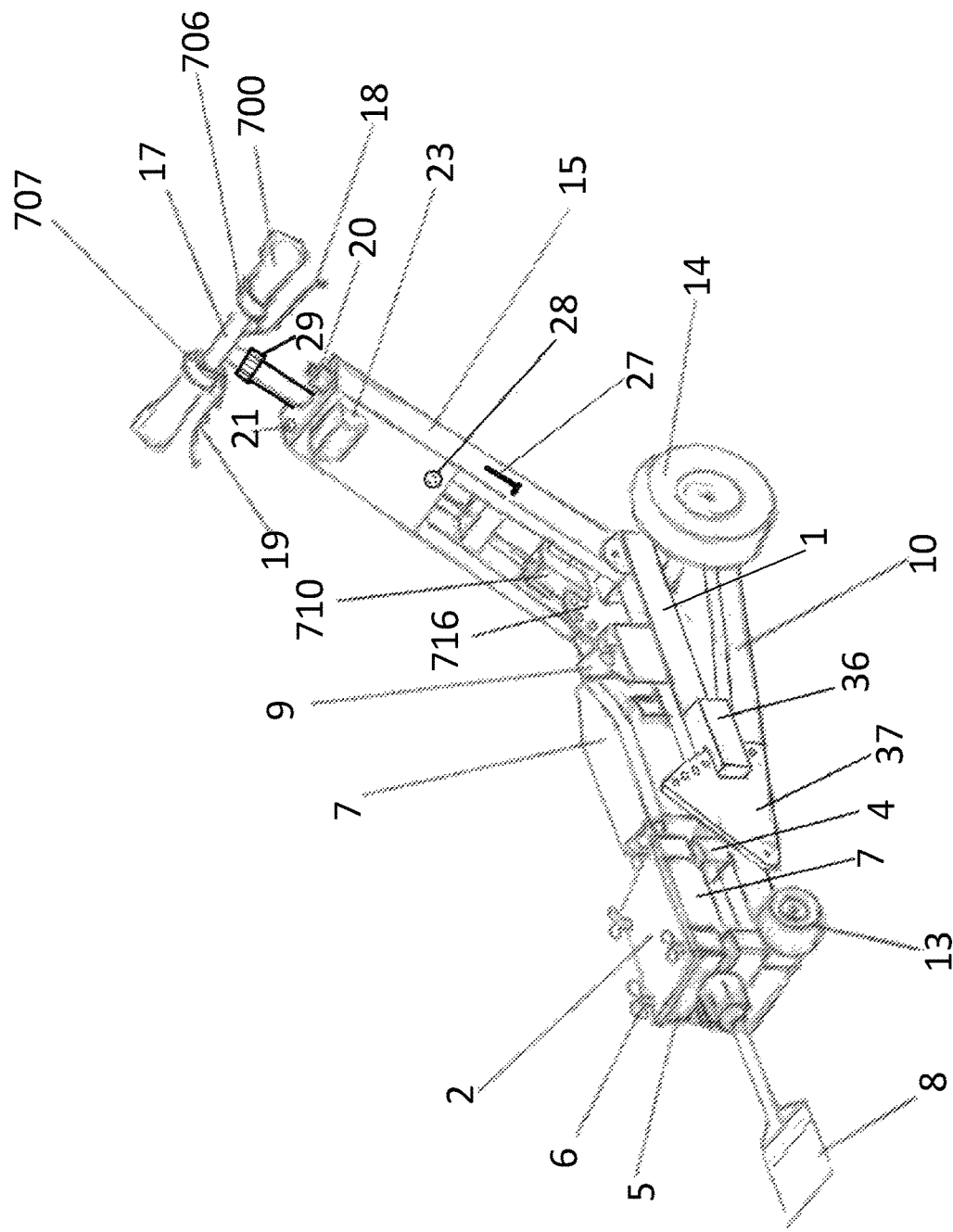
FIG. 2 is a perspective view of the folding jackhammer trolley, according to an embodiment of the present invention.
Figure 3:
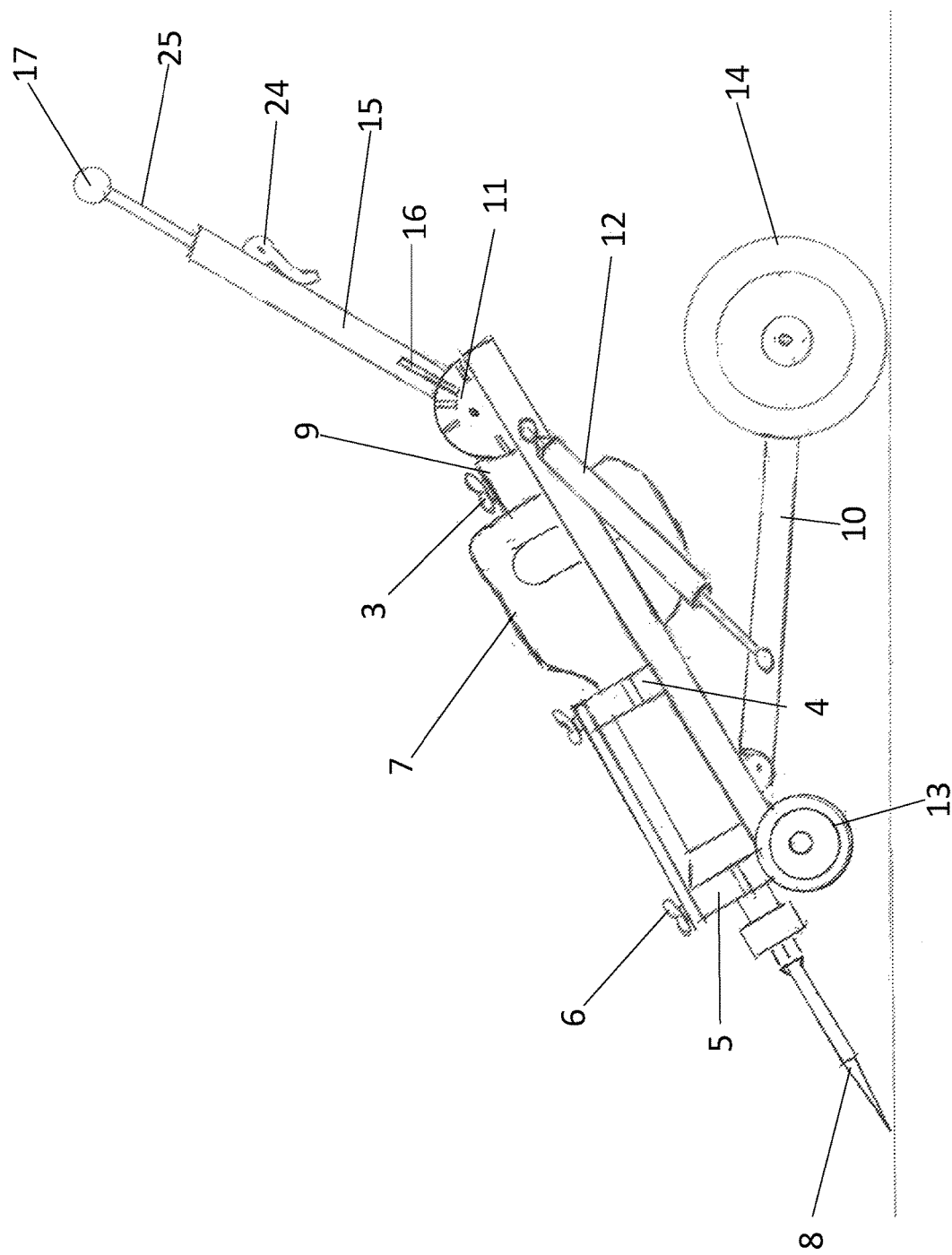
FIG. 3 is a side plan view of the folding jackhammer trolley, according to an embodiment of the present invention.

In an embodiment, with reference to FIG. 1-3, the folding jackhammer trolley is shown, comprising of a main frame 1. In a preferred embodiment, the top bracket assembly 5 and bottom brackets 4 provide a clamping force on an electric jackhammer 7 by one or more wingnut bolts 6 which pass through one or more apertures provided in the top bracket assembly 5 and bottom brackets 4, and engage in threaded apertures provided within the main frame 1. In another embodiment, the bottom brackets 4 are welded to the main frame 1. One or more wingnut bolts 6 which pass through one or more apertures provided in the top bracket assembly 5 and engage in threaded apertures provided within the bottom brackets 4. In another embodiment, one or more bolts (not shown) protrude from the bottom brackets 4, passing through apertures provided in the top bracket assembly 5. The top bracket assembly 5 is then clamped down via one or more wingnuts 6 which thread onto the protruding bolts.

In the preferred embodiment, the top bracket assembly 5, the bottom brackets 4, and the wingnut bolts 6 comprise the bracket assembly 2, which is configured to secure an electric jackhammer 7. The bracket assembly 2 secures the jackhammer 7 with a clamping force to limit shaking and support the weight of the jackhammer 7. In a preferred embodiment, the jackhammer 7 is placed in an upright position and as close to the main frame 1 as possible. In an embodiment, the jackhammer is provided with a chisel 8 to remove tile from a concrete floor, as is known in the art. In a preferred embodiment, the force created by the jackhammer 7, when operating, is dampened by a bumper 9. The bumper is fastened to the main frame 1 via one or more wingnuts 3 engaged with one or more bolts (not shown). In a preferred embodiment, one or more rollers 13 are attached to the front the main frame 1, underneath the bracket assembly 2. In the embodiment, the arrangement of the rollers 13 provides support for the jackhammer 7. In an embodiment, the rollers 13 may be solid rubber, metal, composite, or another material deemed suitable by one in the art.

In a preferred embodiment, the folding jackhammer trolley is further comprised of a wheel frame 10. The wheel frame 10 is adjustably attached to the main frame 1 via one or more hydraulic actuators 12. In another embodiment, the wheel frame 10 is adjustably attached to the main frame 1 via one a disc clutch 36 engaged with a slotted plate 37, as is known in the art. In the preferred embodiment, the hydraulic actuators 12 are rotatably fixed to the wheel frame 10, and adjustably fixed to the main frame 1 via a disc clutch (not shown), as is known in the art. One or more wheels 14, are attached to the rear of the wheel frame 10. In a preferred embodiment, the wheels 14 are solid rubber, as is known in the art. In another embodiment, the wheels 14 may be a metal, plastic, hollow rubber, or another material deemed appropriate by one skilled in the art. In a preferred embodiment, the arrangement of the wheels 14 and rollers 13 provides support for the folding jackhammer trolley with a mounted jackhammer 7, and allows a user to move the folding jackhammer trolley with relative ease.

In an embodiment, the folding jackhammer trolley is further comprised of a handle frame 15 adjustably fixed to the main frame, via a slotted disc 11 engaged with a spring-loaded plate 16. In another embodiment, the handle frame 15 is adjustably fixed to the main frame, via a locking mechanism 710 engaged with a clutch disc 716. In the preferred embodiment, protruding from the handle frame 15 is a handlebar post 25 with a handlebar 17 welded perpendicular to the post 25. In an embodiment, the post 25 is provided with a hydraulic shock absorber 29 retained within the handle frame 15. The hydraulic shock absorber 29 is configured to reduce translated vibrations to the hands of the operator. The hardness of the shock absorber 29 should be adjustable, as is known in the art, to achieve a desired level of comfort. In a preferred embodiment, the post 25 is further provided with a post clamp 24. If a user places the clamp 24 into an unlocked position, they will then be able to adjust the height of the handlebar 17 by extending or retracting the post 25 out of or into a cavity within the handle frame 15, as is known in the art. This adjustment of the handlebar height allows for users of different heights to position the handlebar comfortably during operation.

In a preferred embodiment, the handle bar is further provided with a handle frame inclination lever 18. The handle frame inclination lever 18 will be engaged by a user as they pull the lever 18 towards the handlebar 17. Upon pulling the lever 18, a line cable will actuate a spring-loaded plate 16 from the slotted disc 11, allowing the angle of the handle frame 15 to be adjusted relative to the main frame 1. Upon releasing the lever 18, the spring loaded plate 16 will be locked into slotted disc 11 in one of the available locking position, as is known in the art. In a preferred embodiment, the handlebar 17 is further provided with a main frame inclination lever 19. The main frame inclination lever 19 will be engaged by a user as they pull the lever 19 towards the handlebar 17. Upon pulling the lever 19, a line cable will actuate a disc clutch 36 to disengage with a slotted plate 37 with allowing the angle of the wheel frame 10 to be adjusted relative to the main frame 1. Upon releasing the lever 19, the disc clutch 36 will be locked into the nearest available locking position of the slotted plate 37, as is known in the art.

In another embodiment, the handle frame inclination lever 18 may be on the left or right side of the handlebar 17. In another embodiment the main frame inclination lever 19 may be on the left or right side of the handlebar 17. In another embodiment, the handlebar may be further provided with a brake lever, to actuate a brake provided at either the rollers 13, the wheels 14, or both the rollers 13 and the wheels 14. The brake lever (not shown) may be placed above or below the handle frame inclination lever 18 or the main frame inclination lever 19. In another embodiment, the brake lever may replace the handle frame inclination lever 18 or the main frame inclination lever 19. In another embodiment, a braking mechanism (not shown) is provided as a foot pedal mounted on either the wheel frame 10, which a user may depress with their foot to brake either the rollers 13, the wheels 14, or both the rollers 13 and the wheels 14.

In a preferred embodiment, the handle frame 15 is further provided with one or more power switches 20 or power buttons. In the embodiment, the power cord (not shown) extending from the jackhammer will be plugged into a power output 28 provided on the handle frame 15. An additional power cord (not shown) will extend from the handle frame 15 to be plugged into a power source. In a preferred embodiment, the power source will be a 110 V AC power supply, but may be any power supply deemed appropriate by one skilled in the art. In an embodiment, the handle frame 15 is further provided with a chord post 27, such that a user may wrap the excess power cord around the post 27 to keep it from entering obstructing operation. In the preferred embodiment, the user will keep the power switch (not shown) of the jackhammer 7 engaged in the on position, so they may utilize the power switch 20, located on the handle frame 15, to active and deactivate the jackhammer 7. In the preferred embodiment, the handle frame 15 is further provided with an electric circuit breaker 22, which will cease electrical connectivity in the event of a power surge. Furthermore, the breaker 22 is provided with a button to be pressed by a user to reset the fuse. In a preferred embodiment, the handle frame 15 is further provided with one or more power indication lights 21. The power indication light 21 allow a user to easily verify if the power switch 20 is activated and if power is being supplied to the folding jackhammer trolley.

In a preferred embodiment, the handlebar 17 is further provided with one or more ergonomic handgrips 700 so the user may comfortably grasp the handlebar 17. In an embodiment, the handlebar 17 is further provided with a button 706. In an embodiment, this button 706 is electrically connected with the circuitry within the handle frame 15. The button 706 may be functionally configured as a cut-off switch, power switch, brake lock, drive assist, or another function as deemed appropriate by one skilled in the art. In an embodiment, the handlebar 17 is further provided with a button 707. In an embodiment, this button 706 is electrically connected with the circuitry within the handle frame 15. The button 706 may be configured as a cut-off switch, power switch, brake lock, drive assist, or another function as deemed appropriate by one skilled in the art.

In a preferred embodiment, a lamp is integrated in the handle frame 15. The lamp 23 will provide a light source to aid operation in dimly lit or dark work environments. In an embodiment, the lamp 23 will turn on when the power switch is activated. In another embodiment, the lamp 23 will turn on when the power cord (not shown) extending from the handle frame 15 is plugged into a power source. In a preferred embodiment, the lamp 23 will be activated by an additional switch (not shown) provided on the handle frame 15. In a preferred embodiment, the lamp will consist of an LED (light emitting diode) source. In another embodiment, the lamp may be a halogen, incandescent, or another type of light emitting source deemed appropriate by one skilled in the art.

In an embodiment of the present invention, the main frame 1 is further provided with a handle 26. The handle 26 is to be fixed to the side of the main frame 1, via welds, rivets, screws, or another means of attachment or fastening deemed appropriate by one skilled in the art, to provide a carrying point for a user. In another embodiment, the handle frame 15 is provided with a handle 27. The handle 27 is to be fixed to the side of the main frame 15, via welds, rivets, screws, or another means of attachment or fastening deemed appropriate by one skilled in the art, to provide a carrying point for a user.

Figure 4:
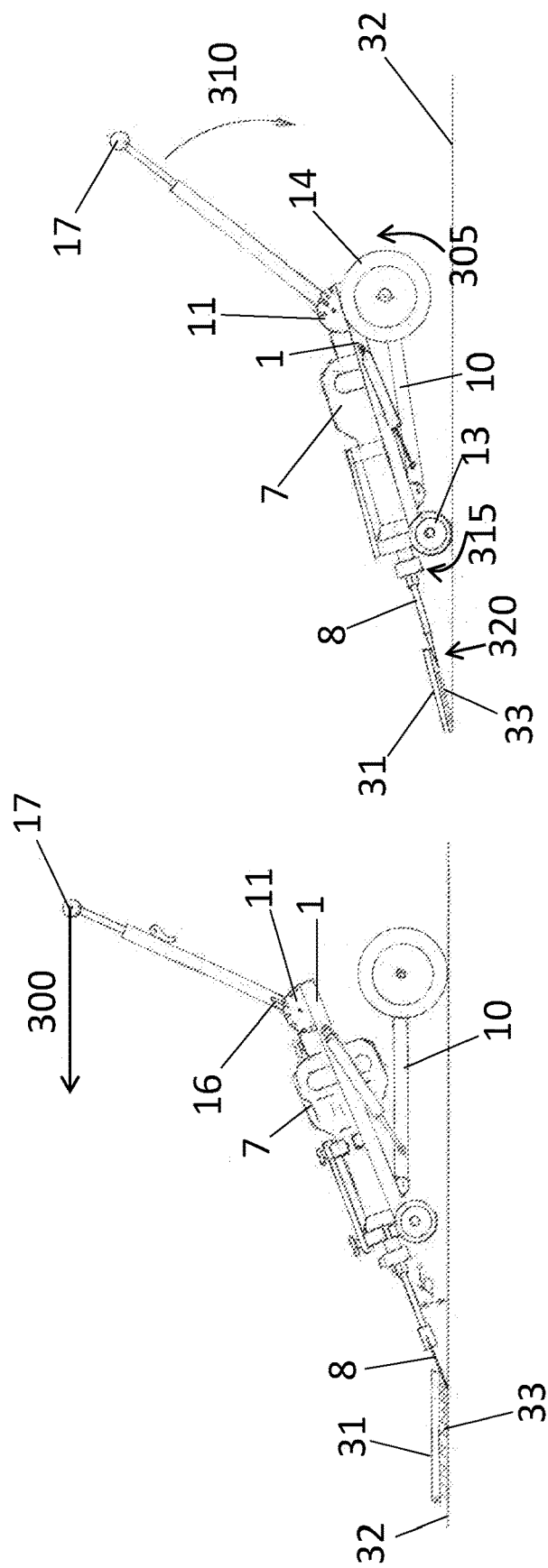
FIG. 4a is a left side elevational view of the folding jackhammer trolley, according to an embodiment of the present invention.
FIG. 4b is a left side elevational view of the folding jackhammer trolley, according to an embodiment of the present invention.

In reference to FIGS. 4a-4b, an embodiment of the present invention is shown engaging a thinset 33 underneath a tile or slab 31 adhered to a floor 32 in a preferred method of removing the slab 31 from the floor 32. At step 300, a user pushes forward on the handlebar 17 folding jackhammer trolley to engage the chisel 8 of the activated jackhammer 7 into the thinset 33. In a preferred method, the angle of inclination should be near 15 degrees relative to the floor. After the chisel 8 is set underneath the slab 31, at step 305 the main frame inclination lever (not shown in FIG. 4) is actuated to allow the wheel frame 10 to be adjusted towards the main frame 1 as a user applies a downward force on the handlebar 17 during step 310. The downward force applied by the user at step 310 will then create a rotational force at step 315 as the roller 13 will act as a fulcrum to pry, at step 320, the slab 31 from the floor 32 using the chisel 8. In another embodiment of the present invention, an assisted drive component (not shown) is provided to power the wheels 14 of the folding jackhammer trolley, as is known in the art. This allows an assisted drive requiring less force for a user to engage the chisel 8 into the thin set 33.

Figure 5:
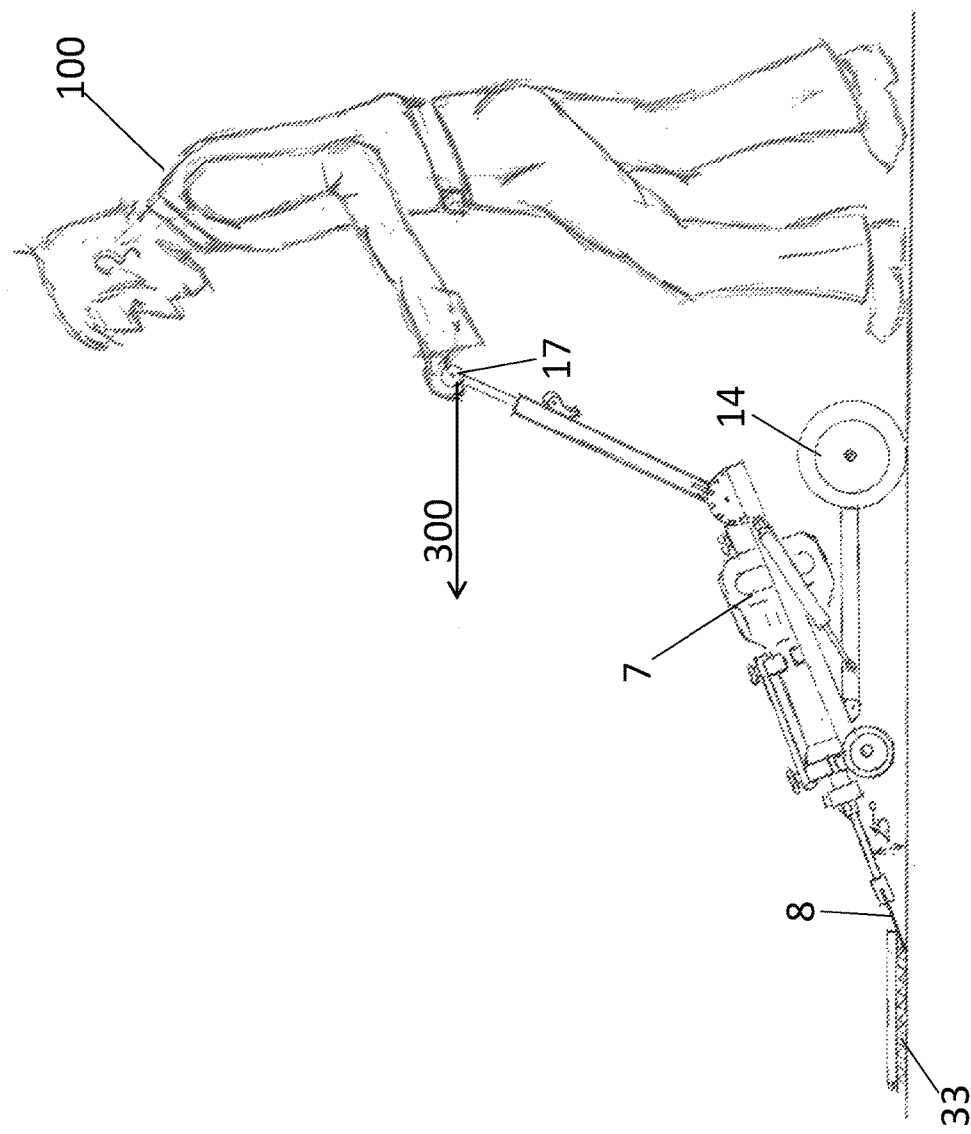
FIG. 5 is a left side elevational view of the folding jackhammer trolley in use, according to an embodiment of the present invention.

In reference to FIG. 5, an embodiment of the present invention is shown in use by a user 100. In an embodiment, the folding jackhammer trolley is adjusted appropriately for a user. At step 300, a user pushes forward on the handlebar 17 to engage the chisel 8 of the activated jackhammer 7 into the thinset 33.

In an embodiment, in reference to FIGS. 6a-6d, a bumper 9 component is shown provided with a wedge cut 51 to contact the handle or user end of a jackhammer 7. The bumper 9 is further provided with one or more apertures 52 to receive a bolt such that the back bumper may adjustably attached to the main frame 10 via a bolt 59, which is received into the bumper holes 58. A wingnut 3 is threaded onto the bolt 59 to fasten the bumper 9 to the main frame 1, compressing the bumper 9 such that it makes contact with the jackhammer 7. In an embodiment, a washer (not shown) may be provided between the wingnut 3 and bumper 9. In another embodiment, the wingnut 3 is provided with a circular base to provide the same function as a washer. In an embodiment, the bumper 9 is made from rubber to provide shock absorbing properties. In another embodiment, the bumper 9 is made from plastic, composite, or another material deemed appropriate by one skilled in the art.

In a preferred embodiment, an extended bumper 53 is shown provided with a wedge cut 54 to contact the handle or user end of a jackhammer 7. The extended bumper 53 is further provided with an extrusion 56 to fit within the main frame 1 and provide further support and shock absorbance when in contact with the jackhammer 7. The extended bumper 53 is further provided with one or more apertures 55 to receive a bolt such that the extended bumper 53 may adjustably attached to the main frame 1 via a bolt 59 which is received into the bumper holes 58. A wingnut 3 is then threaded onto the bolt 59 to fasten the extended bumper 53 to the main frame 1, compressing the extended bumper 53 such that it makes contact with the jackhammer 7. In an embodiment, a washer (not shown) may be provided between the wingnut 3 and extended bumper 53. In another embodiment, the wingnut 3 is provided with a circular base to provide the same function as a washer. In the preferred embodiment, the extended bumper 53 is further provided with a bevel 60 to provide the desired angle of contact with the wingnut 3. In an embodiment, the extended bumper 53 is made from rubber to provide shock absorbing properties. In another embodiment, the extended bumper 53 is made from plastic, composite, or another material deemed appropriate by one skilled in the art.

In reference to FIG. 6c, an embodiment of the present invention is shown wherein the main frame 1 is provided with a plurality of bracket holes 57 to adjustably receive a bracket mechanism to mount a jackhammer 7. In an embodiment, the main frame 10 is further provided with a plurality of bumper holes 58 to adjustably receive a bumper 9 or extended bumper 53 via a wingnut 3 and bolt 59 fastening method, as is known in the art.

In reference to FIG. 6d, an embodiment of the present invention is shown wherein the extended bumper 53 is compressed against the main frame 1 at step 500 by tightening the wingnut 3 onto the bolt 59. The compression causes the extended bumper 53 to make contact with the jackhammer 7, such that the extended bumper 53 provides support and shock absorbency when the jackhammer 7 is operated. In another embodiment, the bumper 9 may be used in place of the extended bumper 53.

In reference to FIG. 7, another embodiment of the bracket assembly is shown wherein a top bracket 201 is clamps down onto a cross section 207 of the jackhammer by fastening one or more wingnuts 206 onto one or more carriage bolts 205 feed through one or more top bracket apertures 203 and main frame apertures 204 to fasten the jackhammer onto the main frame 1. In reference to FIG. 7a, an embodiment of the bracket assembly is shown, wherein one or more bottom brackets 202 are secured in place by the force provided from cross section 207 being forced towards the main frame 1 by the fastening mechanism of the wingnuts 206 threading onto the bolts 205. In reference to FIG. 7b, another embodiment of the bracket assembly is shown, wherein the bolts 205 pass through the main frame apertures 204, one or more bottom bracket apertures 208, and the top bracket apertures 203. The wingnuts 206 are then threaded onto the bolts 205 to fasten the bracket assembly and secure the cross section 207 of the jackhammer. In a preferred embodiment, one or more shims 209 may be provided to adapt the bracket assembly to receive cross sections 207 of different sizes and shapes. The shims 209 may have different dimensions and may be washers, plates, or other shapes deemed appropriate by one skilled in the art.

In reference to FIG. 8, according to an embodiment of the present invention, multiple bracket assemblies are shown configured to receive various cross sections of jackhammers. In reference to FIG. 8a, according to an embodiment of the present invention, a bracket assembly is shown to receive a jackhammer with an elliptical cross section. In reference to FIG. 8b, according to an embodiment of the present invention, a bracket assembly is shown to receive a jackhammer with a squared cross section. In reference to FIG. 8a, according to an embodiment of the present invention, a bracket assembly is shown to receive a jackhammer with an irregular cross section.

Figure 9:
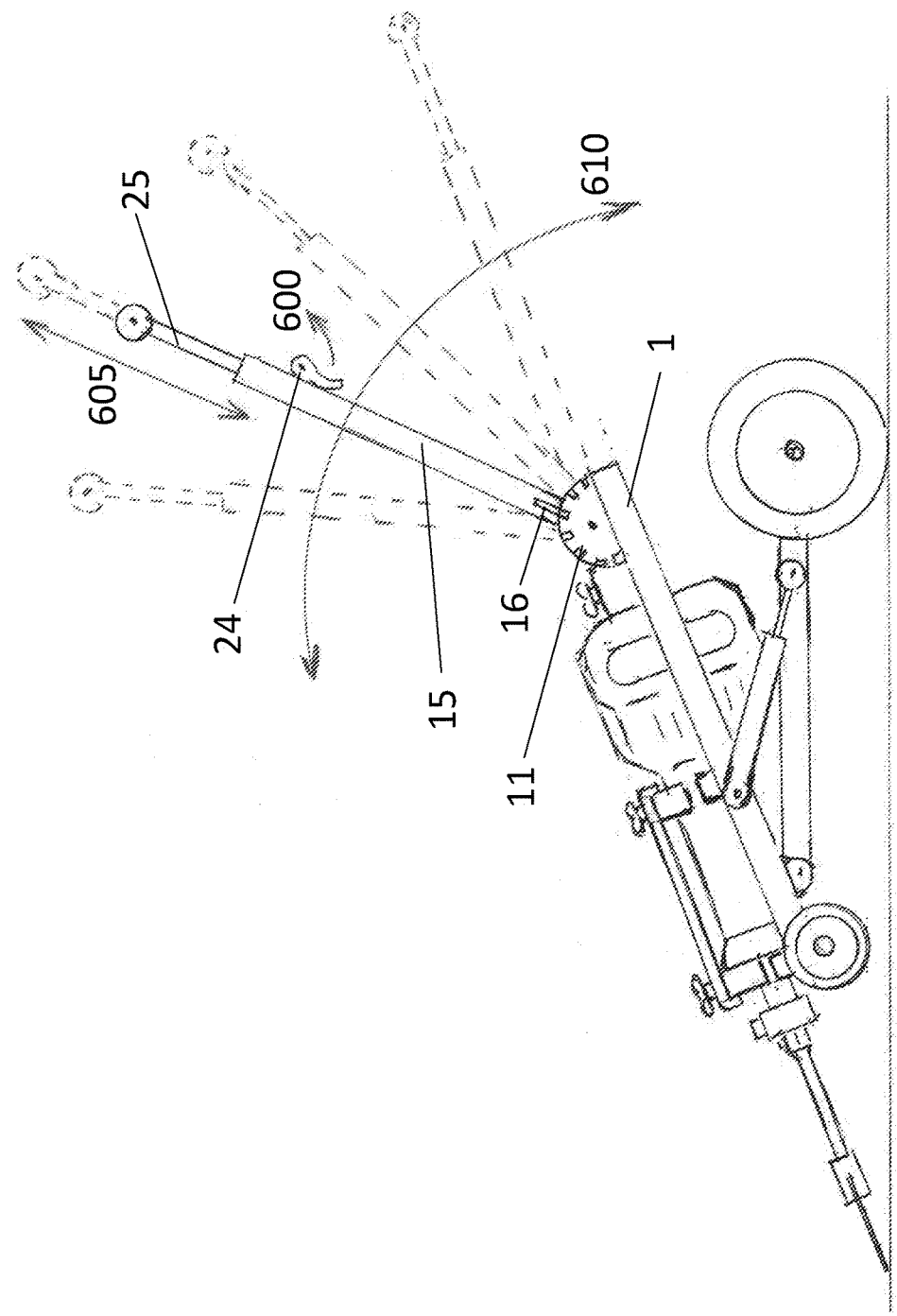
FIG. 9 is a left side elevation view of the folding jackhammer trolley, according to an embodiment of the present invention.
Figure 10:
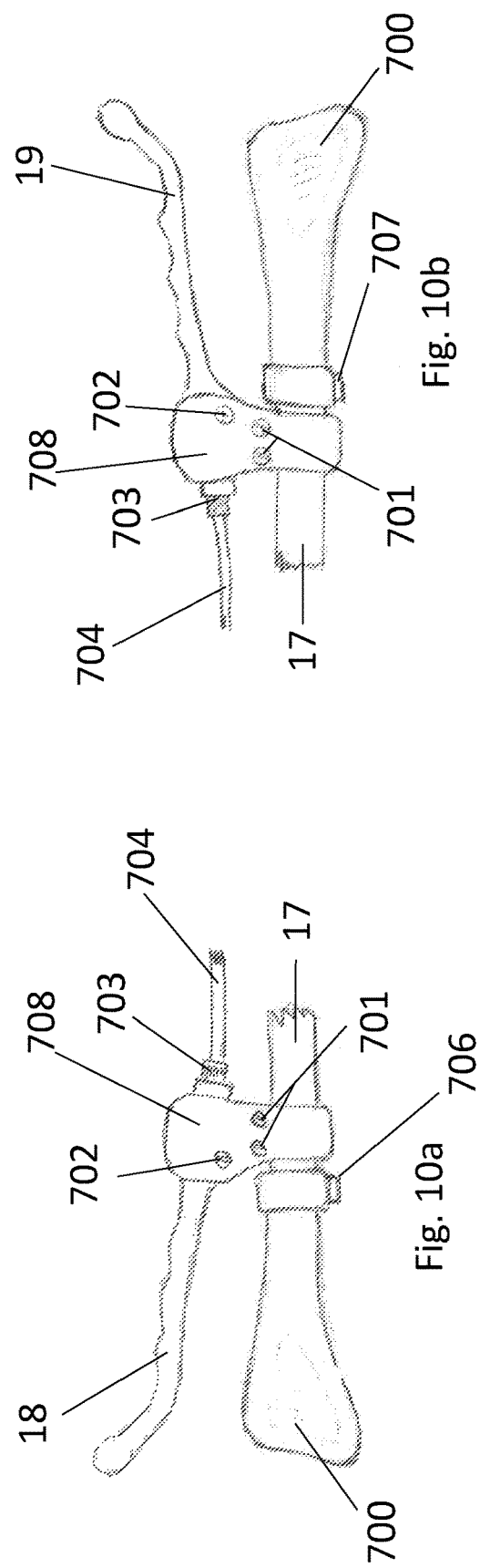
FIG. 10a is a top plan view of the handle inclination lever component, according to an embodiment of the present invention.
FIG. 10b is a top plan view of the main frame inclination lever component, according to an embodiment of the present invention.

In reference to FIG. 9, an embodiment of the folding jackhammer trolley is shown depicting the extensibility of the handlebar post 25 and adjustability of the handlebar frame 15 relative to the main frame 1. In an embodiment, at step 600, a user releases the post clamp 24 and adjusts the exposed length of the handlebar post 25 at step 605. Once the desired length is achieved, a user would then close the post clamp 24 to keep the post 25 at the desired length. In an embodiment, at step 610, a user engages the handle frame inclination lever (not shown) to release the clutch mechanism and change the angle of the handle frame 15 relative to the main frame 1. After the desired angle is achieved, the user releases the handle frame inclination letter and the handle frame 15 locks into the nearest fixed position.

In an embodiment, in reference to FIG. 10a, the handle frame inclination lever 18 is shown with one end removably housed in a perch 708, as is known in the art. The perch 708, is fastened to the handlebar 17 via one or more screws 701. Provided on the perch is a lever reach adjustment screw 702, which may be adjusted to configure the distance from the lever 18 to the handlebar 17, as is known in the art. A cable adjustment barrel 703 is threaded into the perch 708 to provide fine adjustments of the cable 704. Rotating the adjustment barrel 703 away from the perch 708 will add tension to the cable, while rotating the adjustment barrel 703 toward the perch 708 will lessen the tension of the cable, as is known in the art. In an embodiment, the lever 18 is provided to be ergonomic, and comfortably fits to the user's hand. In a preferred embodiment, the handlebar 17 is further provided with an ergonomic handgrip 700 so the user may comfortably grasp the handlebar 17. In an embodiment, the handlebar 17 is further provided with a button 706. In an embodiment, this button 706 is electrically connected with the circuitry within the handle frame 15. The button 706 may be functionally configured as a cut-off switch, power switch, brake lock, drive assist, or another function as deemed appropriate by one skilled in the art.

In an embodiment, in reference to FIG. 10b, the main frame inclination lever 19 is shown with one end removably housed in a perch 708, as is known in the art. The perch 708, is fastened to the handlebar 17 via one or more screws 701. Provided on the perch is a lever reach adjustment screw 702, which may be adjusted to configure the distance from the lever 19 to the handlebar 17, as is known in the art. A cable adjustment barrel 703 is threaded into the perch 708 to provide fine adjustments of the cable 704. Rotating the adjustment barrel 703 away from the perch 708 will add tension to the cable, while rotating the adjustment barrel 703 toward the perch 708 will lessen the tension of the cable, as is known in the art. In an embodiment, the lever 19 is provided to be ergonomic, and comfortably fits to the user's hand. In a preferred embodiment, the handlebar 17 is further provided with an ergonomic handgrip 700 so the user may comfortably grasp the handlebar 17. In an embodiment, the handlebar 17 is further provided with a button 707. In an embodiment, this button 706 is electrically connected with the circuitry within the handle frame 15. The button 706 may be configured as a cut-off switch, power switch, brake lock, drive assist, or another function as deemed appropriate by one skilled in the art.

In reference to FIG. 11, an embodiment of the present invention is shown with detail of the slotted disc 11 and spring loaded plate 16 interaction, which allows adjustability of the main frame 1 relative to the handle frame 15. In an embodiment, the folding jackhammer trolley is shown wherein a user may provide tension to the cable 704 via the handle frame inclination lever (not shown), to compress the spring 711 and remove the plate 16 from the slotted disc 11. While the lever is held in by the user, the angle between the main frame 1 and the handle frame 15 may be adjusted by the user. After the desired position is achieved, the user may release the lever so the plate 16 may engage into the slotted disc 11 to lock the handle frame 15 in place.

In an embodiment, in reference to FIG. 12a, a clutch locking mechanism 710 is shown engaged with a clutch disc 716 to replace the slotted disc and spring-loaded plate mechanism. In an embodiment, the clutch disc 716 is provided with a plurality of cavities, so the bearings (not shown) of the locking mechanism 710 may engage into the cavities and lock the assembly in place. A cable 704 protrudes from the locking mechanism 710 and is engaged with the locking mechanism 710, such that when tension is applied to the cable 704 the bearings disengage with the cavities and the locking mechanism 710 is able to be repositioned.

In an embodiment, in reference to FIG. 12b, a locking mechanism 710 is shown attached to the handle frame 15 of the folding jackhammer trolley. In a preferred embodiment, the locking mechanism 710 is welded to the handle frame 15. In another embodiment, the locking mechanism 710 is attached to the handle frame 15 via screws, bolts, rivets, or another means of fastening. The locking mechanism 710 is engaged to the clutch disc 716, such that when a user applies tension to the cable 704, via the handle inclination lever (not shown), the locking mechanism 710 is able to be repositioned about the clutch disc 716. In a preferred embodiment, the clutch disc 716 is welded to the main frame 1. In another embodiment, the clutch disc 716 is attached to the main frame 1 via screws, bolts, rivets, or another means of fastening. The arrangement allows for the angle of inclination between the handle frame 15 and the main frame 1 to be adjusted by a user when they apply tension to the cable 704 via a lever (not shown).

In reference to FIG. 12c, an embodiment of the locking mechanism 710 is shown in a locked position. The locking mechanism 710 is further provided with a casing 712 to enclose all components of the locking mechanism. The locking mechanism additionally comprises of a spring 713 to engage a retaining bracket 714 such that one or more ball bearings 715 are pressed into cavities provided on the clutch disc 716. In reference to FIG. 12d, an embodiment of the locking mechanism 710 is shown in an unlocked position wherein a user has provided tension on cable 704 via a lever (not shown). The pulling of cable 704 compresses spring 713 such that the ball bearings 715 fall from the cavities of the clutch disc 716 and into the recess 717 of the retaining bracket 714. This action disengages the locking mechanism 710 allowing a user to reposition the casing 710 about the clutch disc 716.

In reference to FIG. 12e-12f, an alternative embodiment of the locking mechanism is shown, wherein a pushing force causes the locking mechanism to disengage. Such an embodiment may be used wherein the lever system is hydraulic.

In reference to FIG. 13, a preferred embodiment of the present invention is shown being folded to allow a user to easily carry the trolley. At step 1000 the handle frame inclination lever (not shown) and the main frame inclination lever (not shown) are pulled by a user. The user then compresses the handle frame 15 towards the main frame 1 and simultaneously compresses the main frame 1 towards the wheel frame 10. At step 1005, the user folds the trolley past the second to last locking position and releases the inclination levers. At step 1010, the user continues to fold the trolley until the handle frame 15 and wheel frame 10 lock into the folded position.

In reference to FIG. 14, another embodiment of the present invention is shown being folded to allow a user to easily carry the trolley. At step 1100 the handle frame inclination lever (not shown) and the main frame inclination lever (not shown) are pulled by a user. The user then compresses the handle frame 15 towards the main frame 1 and simultaneously compresses the main frame 1 towards the wheel frame 10. At step 1105, the user folds the trolley past the second to last locking position and releases the inclination levers. At step 1110, the user continues to fold the trolley until the handle frame 15 and wheel frame 10 lock into the folded position.

In reference to FIG. 15a, an embodiment of the folding jackhammer trolley is shown, wherein a user is carrying the folded trolley by grabbing the handlebar 17 and rolling the trolley on the wheel 14. In reference to FIG. 15b, an embodiment of the folding jackhammer trolley is shown, wherein a user is carrying the folded trolley by grabbing one of the carrying handles 26.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

I claim:

1. A jackhammer folding trolley comprising:
   a. a main frame comprising:
      i. a front end and a rear end;
      ii. one or more adjustable brackets adapted to retain a jackhammer;
      iii. one or more rollers provided at the front end of the main frame;
   b. a wheel frame adjustably attached to the main frame via a first clutch locking mechanism, the wheel frame comprising:
      i. one or more wheels;
   c. a handle frame adjustably attached to the rear end of the main frame via a second clutch locking mechanism, the handle frame comprising:
      i. a top end and a bottom end;
      ii. a handlebar extending from the top end; and
      iii. one or more adjustment levers mounted on the handlebar;
         wherein a first of the one or more adjustment levers adjusts the angle of the wheel frame relative to the main frame.

2. The jackhammer folding trolley of claim 1, further comprising a second adjustment lever mounted on the handlebar to adjust the angle of the handle frame relative to the main frame.

3. The jackhammer folding trolley of claim 1, comprising a bumper on the rear end of the main frame to dampen kick back from the jackhammer retained by the one or more adjustable brackets.

4. The jackhammer folding trolley of claim 1, comprising a shock absorber between the handle frame and handlebar.

5. The jackhammer folding trolley of claim 4, wherein the shock absorber allows the handlebar to be extensible.

6. The jackhammer folding trolley of claim 1, further comprising a power output provided on the handle frame.

7. The jackhammer folding trolley of claim 6, further comprising of a breaker switch provided on the top end of the handle frame.

8. The jackhammer folding trolley of claim 6, further comprising a lamp provided on the handle frame.

9. The jackhammer folding trolley of claim 6, further comprising a cord post provided on the handle frame.

10. The jackhammer folding trolley of claim 1, further comprising a carrying handle attached to the main frame.

11. The jackhammer folding trolley of claim 1, further comprising two ergonomic hand grips mounted onto the handlebar.

12. A jackhammer folding trolley comprising:
    a. a main frame comprising:
       i. a front end and a rear end;
       ii. one or more adjustable brackets adapted to retain a jackhammer;
       iii. one or more rollers provided at the front end of the main frame;
    b. a wheel frame adjustably attached to the main frame via a first clutch locking mechanism, the wheel frame comprising:
       i. one or more wheels;
    c. a handle frame attached to the rear end of the main frame, the handle frame comprising:
       i. a top end and a bottom end;
       ii. a handlebar extending from the top end;
       iii. one or more adjustment levers mounted on the handlebar;
       iv. a power output; and
       v. a lamp,
       wherein a first of the one or more adjustment levers adjusts the angle of the wheel frame relative to the main frame.

13. The jackhammer folding trolley of claim 12, wherein the handle frame is adjustably attached to the main frame via a second clutch locking mechanism.

14. The jackhammer folding trolley of claim 13, further comprising a second adjustment lever mounted on the handlebar to adjust the angle of the handle frame relative to the main frame.

15. The jackhammer folding trolley of claim 12, comprising a bumper on the rear end of the main frame to dampen kick back from the jackhammer retained by the one or more adjustable brackets.

16. The jackhammer folding trolley of claim 12, comprising a shock absorber between the handle frame and handlebar.

17. The jackhammer folding trolley of claim 16, wherein the shock absorber allows the handlebar to be extensible.

18. The jackhammer folding trolley of claim 12, further comprising of a breaker switch provided on the top end of the handle frame.

19. The jackhammer folding trolley of claim 12, further comprising a cord post provided on the handle frame.

20. The jackhammer folding trolley of claim 12, further comprising a carrying handle attached to the main frame.

* * * * *